(12) United States Patent
Yasutake et al.

(10) Patent No.: US 6,395,245 B1
(45) Date of Patent: May 28, 2002

(54) METHOD FOR PREPARING CARBON-CONTAINING COMPOSITION

(75) Inventors: Tsuyoshi Yasutake; Hideaki Miyashita; Sadaichi Komohara; Hiroshi Masuda; Tadashi Yoshino, all of Shimonoseki; Fumio Nakamura, Takaishi; Nobuyuki Sutoh, Yokohama, all of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 08/407,033

(22) Filed: Mar. 17, 1995

Related U.S. Application Data

(63) Continuation of application No. 08/150,120, filed as application No. PCT/JP92/00424 on Apr. 6, 1992, now abandoned.

(51) Int. Cl.⁷ .............................................. C01B 31/30
(52) U.S. Cl. ..................... 423/291; 423/439; 423/440; 423/345; 106/436; 106/474; 106/453; 106/456; 106/475
(58) Field of Search .................... 423/409, 410, 423/411, 439, 440, 345, 346, 291; 106/436, 437, 474, 453, 475, 456

(56) References Cited

U.S. PATENT DOCUMENTS

| | | | | |
|---|---|---|---|---|
| 3,301,694 A | * | 1/1967 | Krovs et al. ................ | 423/450 |
| 3,686,347 A | * | 8/1972 | Dean et al. ................. | 423/594 |
| 3,811,916 A | * | 5/1974 | Russell et al. .............. | 423/439 |
| 4,752,456 A | * | 6/1988 | Yoda et al. ................. | 423/439 |
| 5,114,695 A | * | 5/1992 | Jain et al. .................. | 423/411 |

FOREIGN PATENT DOCUMENTS

| | | | | |
|---|---|---|---|---|
| AU | 277467 | * | 1/1964 | ................ 423/439 |
| EP | 0 111008 | | 6/1984 | |
| EP | 0 247907 | | 12/1987 | |
| JP | 50-12790 | | 10/1975 | |
| JP | 51-18398 | | 6/1976 | |
| JP | 58-207938 | | 12/1983 | |
| JP | 61-132555 | | 6/1986 | |

OTHER PUBLICATIONS

Chemical Abstracts, vol. 118, No. 26, AN–257634f, Jun. 28, 1993, JP–5–058614, Mar. 9, 1993.

\* cited by examiner

Primary Examiner—Stuart L. Hendrickson
(74) Attorney, Agent, or Firm—Oblon, Spivak, McClelland, Maier & Neustadt, P.C.

(57) ABSTRACT

A method for preparing a carbon-containing composition is disclosed which comprises the steps of introducing, into a hot gas, a dispersion obtained by dispersing, in a decomposable carbon compound, a metal oxide and/or a metal compound which can be converted into the metal oxide by heating, to form a carbon-containing composition containing simple carbon and the corresponding metal oxide; and then collecting the formed carbon-containing composition. This carbon-containing composition is useful for the manufacture of a ceramic powder for sintering.

12 Claims, 1 Drawing Sheet

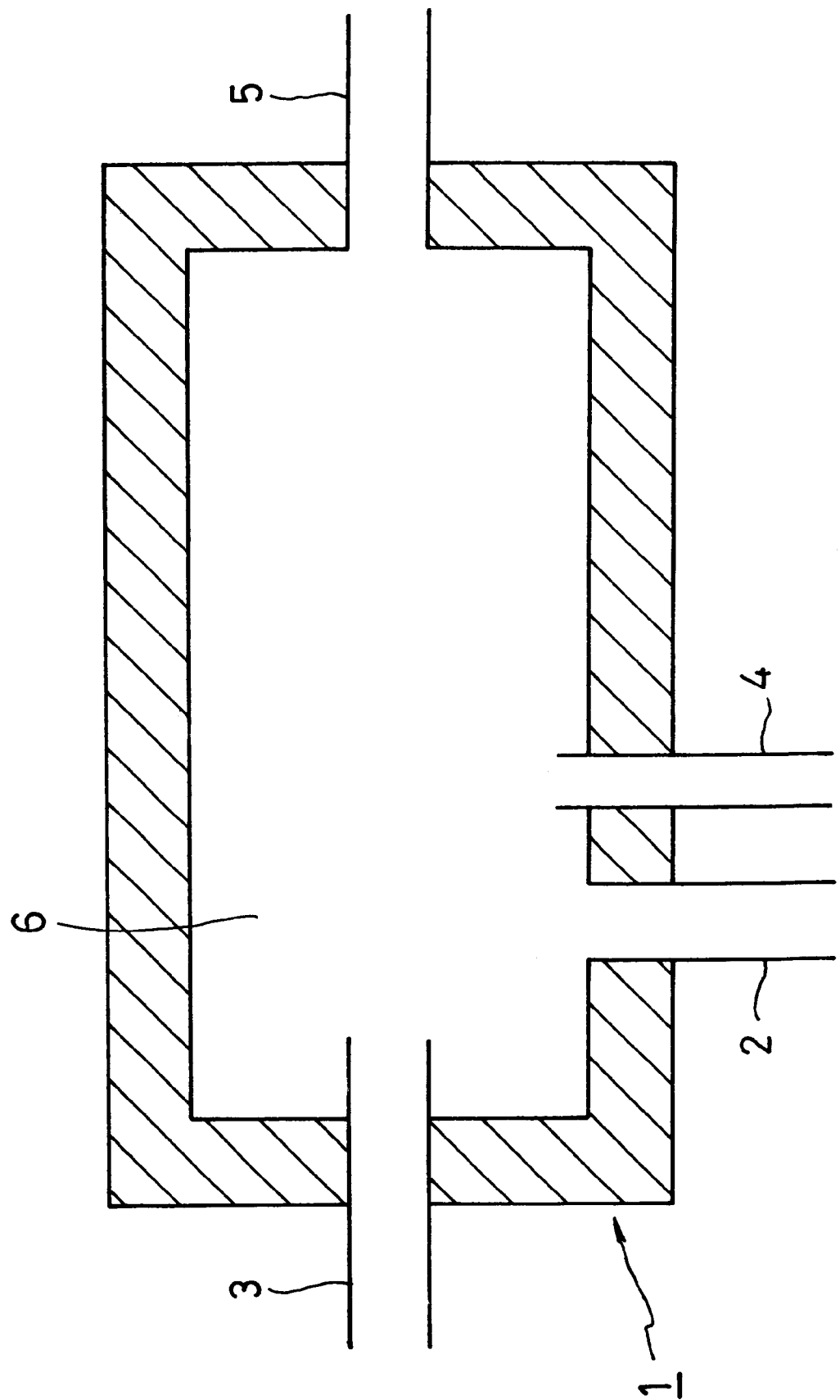

METHOD FOR PREPARING CARBON-CONTAINING COMPOSITION

This application is a Continuation of application Ser. No. 08/150,120, filed on Dec. 2, 1993, now abandoned, which was filed as International Application No. PCT/JP92/00424, on Apr. 6, 1992.

TECHNICAL FIELD

The present invention relates to a method for preparing a finely and uniformly mixed carbon-containing composition containing a metal oxide and simple carbon suitable for the manufacture of a ceramic powder for sintering.

More specifically, it relates to a method for preparing a carbon-containing composition containing a metal oxide and simple carbon suitable for the manufacture of a metal carbide, a metal nitride, a metal carbonitride, a metal oxynitride and the like.

BACKGROUND ART

As methods for preparing metal carbide powders which are useful as materials of ceramics for sintering, there have heretofore been known (1) a reduction/carbonization of a metal oxide with carbon, (2) a direct carbonization of a metal, and (3) a gaseous phase reaction between a decomposable metal compound and a hydrocarbon.

As methods for preparing a metal nitride powder, there have been known (4) a method in which a mixture of a metal oxide and carbon is heated up to a high temperature in the atmosphere of a nitrogen-containing compound (e.g., nitrogen or ammonia), (5) a direct nitrization of a metal, and (6) a gaseous phase reaction between a decomposable metal compound and a nitrogen compound such as ammonia.

Furthermore, as a method for preparing a metal carbonitride powder, a method is known in which a conversion of a metal oxide is made with carbon in an amount insufficient to convert the metal oxide into a metal carbide but excessive to convert the same into a metal nitride in the above-mentioned method (4).

Moreover, as a method for preparing a metal oxynitride powder, (7) a method is known in which a conversion of a metal oxide is made with carbon in an amount insufficient to convert the total of the metal oxide into a metal nitride in the above-mentioned method (4).

In the manufacture of a ceramic powder of the metal carbide, metal nitride, metal carbonitride, metal oxynitride or the like by the above-mentioned method, a mixture of a metal oxide and carbon is important as its manufacturing material.

The obtained ceramic powder is usually molded and then sintered. In preparing the sinter, the finer and purer the particles of the ceramic powder are and the sharper a particle diameter distribution is, the higher the density of the sinter is (hereinafter referred to as "easy sintering properties") and the higher the strength of the sinter is.

In order to prepare such a preferable ceramic powder, it is necessary to control the mixing state of a mixture of a metal oxide and carbon which are materials in consideration of a reaction mechanism. Heretofore, the mixing of the metal oxide and carbon has usually been carried out by mechanically mixing a fine metal oxide powder and a carbon powder by the use of a kneader, a mixer or the like.

In this method, however, these powders are mechanically mixed, and so, when mixed, the powders furiously flutter about and working environment is worsen. In addition, there is a problem that impurities are easily entrained owing to the mechanical friction of the kneader, the mixer or the like.

Moreover, the fine metal oxide and carbon having a size of micron order are usually in the state of secondary aggregates, and the finer these aggregates are, the larger their cohesive force is. Therefore, even if the stirring power of the machine is set to a maximum level, these powders cannot be separated into independent particles, so that it is difficult to uniformly mix them. In addition, there is a density difference between the metal oxide and carbon. Therefore, in the case of the mechanical mixing, there is a substantial problem that it is very difficult to obtain a "uniform" mixture, though "a fine state" can be achieved.

In order to solve these problems, the present inventors have suggested, in Japanese Patent Publication No. 61-30613, a method in which a decomposable metal compound and a decomposable carbon compound are introduced into a hot gas containing water vapor to decompose them, whereby a desired mixture of the metal oxide and carbon is formed in a gaseous phase. According to this method, the uniform mixture can be obtained in which the fine metal oxide and carbon are uniformly mixed. The employment of this mixture permits manufacturing a fine metal carbide having a sharp particle diameter distribution.

However, the decomposable metal compound which is used in this method has some drawbacks in industrial production.

The first drawback is that these decomposable metal compounds are extremely difficult to handle because of being chemically active. For example, the decomposable metal compounds are easily combustible substances having a low flash point, and so, when burned, they generate a toxic gas and when reacted with moisture in the atmosphere, they form the mist of the metal oxide inconveniently. Consequently, in order to safely utilize these substances, additional facilities such as an explosion-proof equipment, a fire-resistant structure and a nitrogen sealing device are required, which increases a manufacturing cost.

The second drawback is that most of these decomposable metal compounds are expensive.

The third drawback is that the relatively inexpensively available decomposable metal compounds usually contain chlorine in the forms of $TiCl_4$ and $SiCl_4$ whose part may be substituted by a hydrocarbon group. Therefore, in the reaction for obtaining a desired carbon-containing composition, hydrochloric acid is formed as a by-product, and in the case of a specific reaction, chlorine is produced inconveniently. In consequence, the mixture of the metal oxide and carbon is contaminated with hydrochloric acid whose amount is trace, with the result that this hydrochloric acid vigorously corrodes devices in the subsequent steps. In addition, corroded substances coming from the corroded devices are entrained as fatal impurities in an easily sinterable ceramic powder which is finally manufactured. In order to prevent these disadvantages, an additional equipment such as a device for removing the corroded components is required, and facilities made of an anti-corrosive high-quality material are necessary in the subsequent steps. Moreover, when a chlorine gas is generated, much attention must be paid to the safety of working circumstances.

As described above, it has been heretofore possible to provide a composition of a metal oxide and carbon suitable for the manufacture of an easily sinterable ceramic powder, but it has been difficult to safely and inexpensively manufacture the composition on an industrial scale.

DISCLOSURE OF THE INVENTION

An object of the present invention is to provide a method for safely and inexpensively preparing a carbon-containing composition having the same fine structure as in a carbon-containing composition described in Japanese Patent Publication No. 61-30613-without carrying out any mechanical mixing operation by the use of a kneader or a mixer which gives rise to the formation of powder dust and the contamination of a composition of a metal oxide and carbon with impurities.

Furthermore, another object of the present invention is to provide a method for preparing a metal carbide powder and a metal nitride powder.

The present inventors have intensively investigated to achieve the above-mentioned objects, and as a result, they have found that a carbon-containing composition in which a fine metal oxide and carbon are uniformly mixed can be obtained by mixing and dispersing a metal oxide and/or a metal compound, which can be converted into the metal oxide by heating, with and in a decomposable carbon compound, and then introducing the resultant dispersion into a hot gas, and that a high-purity and fine easily sinterable ceramic powder having a sharp particle diameter distribution can be obtained by heating the carbon-containing composition. On the basis of these knowledges, the present invention has been completed.

Therefore, the present invention is directed to a method for preparing a carbon-containing composition which comprises the steps of introducing, into a hot gas, a dispersion obtained by dispersing, in a decomposable carbon compound, a metal oxide and/or a metal compound which can be converted into the metal oxide by heating, to form a carbon-containing composition containing simple carbon and the corresponding metal oxide; and then collecting the formed carbon-containing composition.

Furthermore, the present invention is directed to a method for preparing a metal carbide powder which comprises the steps of introducing, into a hot gas, a dispersion obtained by dispersing, in a decomposable carbon compound, a metal oxide and/or a metal compound which can be converted into the metal oxide by heating, to form a carbon-containing composition containing simple carbon and the corresponding metal oxide; and then heating the thus formed carbon-containing composition in an inert atmosphere.

In addition, the present invention is directed to a method for preparing a metal nitride powder which comprises the steps of introducing, into a hot gas, a dispersion obtained by dispersing, in a decomposable carbon compound, a metal oxide and/or a metal compound which can be converted into the metal oxide by heating, to form a carbon-containing composition containing simple carbon and the corresponding metal oxide; and then heating the thus formed carbon-containing composition in a nitrogen-containing atmosphere.

BRIEF DESCRIPTION OF THE DRAWINGS

FIG. 1 is a sectional view of one example of a reaction furnace which can be used in the practice of the present invention.

1 ... Reaction furnace
2 ... Duct
3 ... Combustion burner
4 ... Nozzle
5 ... Duct
6 ... Space region

BEST MODE FOR CARRYING OUT THE INVENTION

As a decomposable carbon compound for use in the present invention, there can be used all of compounds which be easily decomposed to form simple carbon when introduced into a hot gas and which are originally in a liquid state or can easily come to the liquid state by heating or cooling.

Examples of the decomposable carbon compound include petroleum products such as gasoline, fuel oil, kerosine, gas oil and heavy oil, petroleum chemicals such as benzene, styrene, a $C_9$ fraction mixture and ethylene bottoms, tar products such as tar, pitch, creosote and naphthalene, and oils such as linseed oil, stearic acid and oleic acid. Need less to say, the decomposable carbon compound are not limited thereto.

A usable metal oxide in the practice of the present invention can be selected from a wide range.

Examples of such a metal oxide include oxides of titanium, zirconium, hafnium, vanadium, niobium, tantalum, chromium, molybdenum, tungsten, manganese, iron, boron, aluminum, silicon, uranium and thorium. Typical examples of the preferably usable metal oxide include $SiO_2$, $TiO_2$, $WO_3$, $B_2O_3$, $Al_2O_3$, $MnO_2$, $Fe_2O_3$, $ZrO_2$, $HfO_2$, $UO_2$, $ThO_2$, $MoO_3$, $Cr_2O_3$, $VO_2$, $V_2O_5$, $Nb_2O_5$ and $Ta_2O_5$.

In the present invention, a metal compound which can be converted into the metal oxide by heating can be used. Examples of such a metal compound include hydrates of the above-mentioned metal oxides, hydroxides, carbonates and oxalates of the above-mentioned metals.

The metal oxide and/or the metal compound which can be converted into the metal oxide by heating is mixed with and dispersed in the decomposable carbon compound to form a dispersion. In this case, even if the metal oxide and/or the metal compound which can be converted into the metal oxide by heating is not dissolved in the decomposable carbon compound, any trouble is not present in the present invention. The dispersion can be achieved by means of a usual stirring machine without any problem, but it is more preferable to use a stirring machine having a high stirring power such as a homomixer.

Furthermore, in order to uniformly disperse, in the decomposable carbon compound, the metal oxide and/or the metal compound which can be converted into the metal oxide by heating, there may be simultaneously used, for example, a physical means utilizing ultrasonic wave or the like or a chemical means in which a dispersant is added to the decomposable carbon compound.

In forming the dispersion, no particular restriction is put on the particle diameter of the metal oxide and/or the metal compound which can be converted into the metal oxide by heating, and this particle diameter depends rather upon the kind, price and purity of compound, and dispersibility attributable to the specific gravity and viscosity of the decomposable carbon compound which is a matrix of the dispersion.

A mixing ratio between the metal oxide and/or the metal compound which can be converted into the metal oxide by heating and the decomposable carbon compound has a direct influence on the composition of a finally formed carbon-containing composition, i.e., carbon/the metal oxide (a ratio of moles of carbon/moles of the metal oxide will be abbreviated to a molar ratio), and therefore much attention should be paid to the mixing ratio. For example, in a typical preparation example of metal carbides from the obtained carbon-containing composition, the reaction formulae for the production of the metal carbides represented by SiC and TiC are as follows:

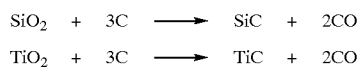

$$SiO_2 + 3C \longrightarrow SiC + 2CO$$
$$TiO_2 + 3C \longrightarrow TiC + 2CO$$

Thus, the mixing ratio must be controlled so that the molar ratio of the carbon-containing composition may be 3 or more, preferably in the range of from 4 to 6.

It depends upon the kind of decomposable carbon compound, reaction conditions and properties of a selected apparatus what percent of the decomposable carbon compound is obtained as simple carbon, but it can be presumed that the carbonization ratio is from about 10 to about 60%.

In the practice of the present invention, a reaction furnace is used. As a heater for a space region in the furnace, a combustion burner, a conductive heating element or the like is preferable. Furthermore, the reaction furnace is equipped with a nozzle for the introduction of the dispersion, a duct for the introduction of a hot gas and a duct for the discharge of the dispersion, and it is preferred that the reaction furnace is lined with a refractory.

In the reaction furnace, the space region must exist in which a temperature of 600° C. or more, preferably 700° C. or more, more preferably from 800 to 2000° C. is maintained, and in this space region, a hot gas is formed. If this temperature range is maintained, the decomposable carbon compound decomposes to produce simple carbon, and the metal compound which can be converted into the metal oxide by heating is also converted into the metal oxide. In general, it is not preferable that the temperature in the reaction furnace is in excess of 2000° C., since such a high temperature only leads to heat loss.

As a means for obtaining the hot gas, a conductive heat generation system or a high-frequency induction heating system is usable. In addition, a system in which a combustible material such as methane, ethane, propane, kerosine or gasoline is burned in air can be carried out by the use of a simple device, and this system is also excellent in heat efficiency and thus it is economical.

The temperature, flow rate and oxygen concentration of the thus obtained hot gas are important factors for determining the particle diameter, specific surface area and bulk density of the finally obtained carbon-containing composition as well as a molar ratio of simple carbon/the metal oxide.

The hot gas may be non-oxidizable. In this case, however, an oil component in the decomposable carbon compound which has not been completely decomposed is accumulated in a low-temperature portion in the furnace sometimes, and therefore care should be taken.

Each of a flow rate and an oxygen concentration of the hot gas is no more than a flow rate of oxygen, i.e., a ratio of oxygen/the decomposable carbon compound [oxygen (kg)/the decomposable carbon compound (kg)], but it is important as a factor for determining a combustion quantity of the above-mentioned decomposable carbon compound. Moreover, the temperature of the hot gas is also important as a factor for determining the rate of the thermal decomposition.

The thermal decomposition mechanism of the decomposable carbon compound cannot be elucidated in detail, but it has been experimentally confirmed by the present inventors that along with the increase of a ratio of the flow rate of oxygen to that of the decomposable carbon compound in the hot gas, the specific surface area of the carbon-containing composition rises and the bulk density of the obtained carbon-containing composition decreases, and that the temperature rise of the hot gas provides the physical properties of the carbon-containing composition with the same tendency as in the increase of the oxygen flow rate.

The particle diameter of the metal oxide in the carbon-containing composition obtained in the reaction furnace does not always correspond to the powder particle diameter of the metal oxide and/or the metal compound which can be converted into the metal oxide by heating in the raw material dispersion. However, the obtained carbon-containing composition has a structure in which the metal oxide and carbon are extremely finely and uniformly mixed, and thus in this point, there is no difference between the obtained composition and the metal oxide and/or the metal compound which can be converted into the metal oxide by heating.

The thus obtained carbon-containing composition in the hot gas is taken out from the furnace, and a solid contained therein is then collected by a known dust collector such as a bug filter, a cyclone or an electric dust collector. In order to relieve heat loading in the dust collector, it is preferable to previously cool the collector. This cooling can be achieved by the use of a heat exchanger or by the direct injection of water. In the case of the direct injection of water, the carbon-containing composition can be collected without using any particular dust collector.

The carbon-containing composition obtained in the present invention can be directly used for various purposes as it is, and one of the most preferable purposes is to use the composition as a raw material for the manufacture of a ceramic powder for sintering. A metal carbide or a composite metal carbide powder can be synthesized by heating the carbon-containing composition of the present invention at 1200 to 2000° C. in an atmosphere of helium, argon, nitrogen or the like. As described in the undermentioned examples, a carbide powder obtained in this manner is a fine and easily sinterable powder having a high purity.

The carbon-containing composition obtained by the present invention can be heated at a temperature of 1200 to 2000° C. in an atmosphere of nitrogen, a nitrogen-containing compound such as ammonia or the like in order to synthesize a metal nitride, a metal carbonitride or a metal oxynitride powder. As described in the undermentioned examples, the metal nitride powder obtained in this way is an easily sinterable powder.

Now, the present invention will be described in more detail in reference to examples.

EXAMPLE 1

A reaction furnace (inner diameter=600 mm, length=3 m) shown in FIG. 1 was used, and air was continuously introduced thereinto at 100 Nm$^3$/hr through a duct 2. Furthermore, a propane gas was continuously fed thereto at 1.8 Nm$^3$/hr and then burned by a combustion burner 3 to generate a hot gas stream at 1100 to 1500° C. in a space region 6 in the reaction furnace. Next, a dispersion was fed to the furnace at 40 kg/hr through a nozzle 4, and this dispersion was prepared by mixing and dispersing a silica powder (purity=99.5%) having an average particle diameter of 5.1 μm (a weight cumulative particle diameter distribution average particle diameter determined by centrifugal sedimentation method, $D_{50}$; the same shall apply hereinafter) as a metal oxide with and in heavy oil A at a weight ratio of $SiO_2$:heavy oil A=1:3 with the aid of a stirrer. The fed dispersion was thermally decomposed to form a dispersing product, and the thus formed dispersing product was cooled and then collected by means of a bug filter, thereby obtaining a carbon-containing composition. The specific surface area of the obtained composition was 47 $m^2/g$. This composition was dispersed in deionized water, followed by filtration. In order to inspect hydrochloric acid in the resultant filtrate, quantitative analysis was carried out, but it was scarcely detected. The obtained composition was dried at 110° C. for 5 hours, and afterward its chemical composition was then analyzed. As a result, it was apparent that the composition was composed of 50.8% by weight of carbon, 49.0% by weight of $SiO_2$ and 0.2% by weight of the balance (a molar ratio of carbon/$SiO_2$=about 5.2). Furthermore, carbon in the obtained carbon-containing composition was removed by combustion. The specific surface area of the remaining white powder was 380 $m^2/g$. In addition, the average particle diameters of silica and carbon were 0.3 μm and 0.5 μm, respectively.

EXAMPLE 2

A hot gas stream was generated under the same conditions as in Example 1. A dispersion was prepared by mixing and dispersing a titania powder (purity=99.0%) having an average particle diameter of 3.5 μm as a metal oxide with and in heavy oil A at a weight ratio of $TiO_2$:heavy oil A=1:2.8, and this dispersion was then fed to a reaction furnace at 40 kg/hr and thermally decomposed to form a carbon-containing composition. The specific surface area (a BET specific surface area by a nitrogen adsorption process; the same shall apply hereinafter) of the obtained composition was 58 $m^2/g$. A molar ratio of carbon to titanium dioxide in the obtained composition was about 6.0. Furthermore, carbon in the obtained carbon-containing composition was removed by combustion. The specific surface area of the titania powder was 332 $m^2/g$. In addition, any hydrochloric acid was not contained in this composition at all.

EXAMPLE 3

A carbon-containing composition obtained in Example 1 was molded by means of a press molding machine, and the molded article had an apparent density of 0.9 $g/cm^3$. Next, the molded article was heated at 1800° C. for 2 hours in an argon atmosphere by the use of a high-frequency heating furnace. After cooling, the molded article was heated at 800° C. in air to burn and remove excess simple carbon, thereby obtaining powdery silicon carbide.

The specific surface area of a silicon carbide powder was 12.4 $m^2/g$, and it was confirmed by powder X-ray diffractometry that its crystal form was a cubic system. Furthermore, metallic impurities in this silicon carbide powder were inspected, and the results are set forth in Table 1. To 100 parts by weight of this silicon carbide powder were added 0.5 part by weight of boron and 4 parts by weight of a phenolic resin, and they were mixed and then molded by a pressing machine. The resultant molded article was sintered at 2100° C. in an argon atmosphere, and in this case, its sinter density was 3.15 $g/cm^3$.

TABLE 1

| Fe | Ni | Cr | Al | Ti |
|---|---|---|---|---|
| 280 | 15 | 20 | 80 | 32 (ppm) |

EXAMPLE 4

A hot gas stream was generated under the same conditions as in Example 1. A dispersion was prepared by mixing and dispersing an $Al_2O_3$ powder (purity=99.8%) having an average particle diameter of 0.5 μm as a metal oxide with and in heavy oil A at a weight ratio of $Al_2O_3$:heavy oil A=1:2.8, and this dispersion was fed to a reaction furnace at 40 kg/hr and then thermally decomposed to form a carbon-containing composition of the present invention. The specific surface area of this composition was 53 $m^2/g$. A molar ratio of carbon to $Al_2O_3$ was 8.1. The obtained carbon-containing composition was black, but when carbon was removed by combustion, white $Al_2O_3$ only remained. Its specific surface area was about 31 $m^2/g$.

EXAMPLE 5

A hot gas stream was generated under the same conditions as in Example 1. A dispersion was prepared by mixing and dispersing an $Al(OH)_3$ powder having an average particle diameter of 0.2 μm as a metal compound, which could be converted into the metal oxide by heating, with and in heavy oil A at a weight ratio of $Al(OH)_3$:heavy oil A=1:2, and this dispersion was fed to a reaction furnace at 40 kg/hr and then thermally decomposed to form a carbon-containing composition of the present invention. The specific surface area of the thus obtained carbon-containing composition was about 69 $m^2/g$. This composition was black. A crystalline phase was inspected by X-ray diffractometry, and as a result, it was confirmed that an $\alpha$-$Al_2O_3$ phase was present. Moreover, when carbon in the obtained composition was removed by combustion, white $\alpha$-$Al_2O_3$ only remained. Its specific surface area was about 43 $m^2/g$.

EXAMPLE 6

35 g of a carbon-containing composition obtained in Example 4 were put on a plate made of a high-purity graphite and then heated at 1500° C. for 6 hours, while a nitrogen gas was allowed to stream at about 3 l/min. Next, excess carbon was removed by combustion. The resultant powder was grayish white, and its specific surface area was about 9.7 $m^2/g$. The X-ray diffraction image indicated AlN only, and any diffraction peak of $Al_2O_3$ was not observed. Furthermore, metallic impurities in this AlN powder were inspected, and the results are set forth in Table 2.

TABLE 2

| Fe | Ni | Cr | Ti |
|---|---|---|---|
| 150 | 18 | 23 | 27 (ppm) |

10 g of the thus obtained AlN powder were thrown into ethanol, and 0.3 g of a $Y_2O_3$ powder was then added thereto. The resultant slurry was mixed and dispersed by means of a ball mill, and afterward, ethanol was evaporated on a hot plate. The obtained powdery mixture was then molded under a pressure of 2 tons/$cm^2$ into a disc having a diameter of 20 mm and a thickness of 7 mm. This molded article was put on a high-purity graphite plate and then sintered by heating the same at 1700° C. for 3 hours in a nitrogen gas stream. The density of the thus sintered article was 98.8% of a theoretical density.

Comparative Example 1

An $SiO_2$ powder (specific surface area=380 m²/g) and a carbon powder (specific surface area=120.4 m²/g) were mixed at a molar ratio of 5 for 5 hours by the use of a ball mill to obtain a material powder. This material powder was molded by all the same procedure as in Example 3 and then heated in an argon atmosphere at 1800° C. for 2 hours by the use of a high-frequency heating furnace. After cooling, the molded article was heated at 800° C. to burn and remove excess simple carbon, thereby obtaining silicon carbide.

The specific surface area of the silicon carbide powder was 4.5 m²/g, and its crystal form was a cubic system.

Following all the same procedure as in Example 3, boron and a phenolic resin were added to this silicon carbide powder, and they were mixed and then molded by a pressing machine. The resultant molded article was sintered at 2100° C. in an argon atmosphere, and its sinter density was less than 2.80 g/cm³.

Comparative Example 2

In accordance with a procedure described in Japanese Patent Publication No. 30613/1986, $SiCl_4$ was used as a decomposable metal compound and heavy oil A was used as a decomposable carbon compound, and flow rates of these compounds were 25 kg/hr and 20 kg/hr, respectively. The other conditions were the same as in Example 1. The above-mentioned materials were fed to a reaction furnace which could be in the present invention, and a carbon-containing composition was obtained.

The specific surface area of the $SiO_2$ powder in the carbon-containing composition was 470 m²/g, and the molar ratio of carbon to silicon in the carbon-containing composition was 4.9. In this carbon-containing composition, hydrochloric acid was contained in a ratio of about 0.2% by weight.

The obtained carbon-containing composition was heated in an argon atmosphere at 1800° C. for 2 hours by the use of a high-frequency heating furnace in all the same manner as in Example 3. After cooling, the composition was heated at 800° C. in air to burn and remove excess carbon, thereby obtaining powdery silicon carbide.

The specific surface area of the silicon carbide powder was 9.6 m²/g. This powder was observed through an electron microscope, and it was perceived that there was a certain amount of a whisker-like substance in addition to the particle substance. Furthermore, impurities in this silicon carbide powder were inspected by analysis, and the results are set forth in Table 3. The silicon carbide powder was sintered in all the same manner as in Comparative Example 1, and its sinter density was 3.08 g/cm³.

TABLE 3

| Fe | Ni | Cr | Al | Ti |
|---|---|---|---|---|
| 450 | 26 | 25 | 19 | 24 (ppm) |

Possibility of Industrial Utilization

As described above in detail, according to the present invention, a metal oxide and/or a metal compound which can be converted into the metal oxide by heating is mixed with and dispersed in a decomposable carbon compound to form a dispersion, and this dispersion is then thermally decomposed in a hot gas, whereby a carbon-containing composition containing simple carbon and the corresponding metal oxide can be obtained extremely effectively. The carbon-containing composition produced by the thermal decomposition has less impurities and more uniform state, as compared with a composition which is obtained by mechanically mixing a carbon powder with a metal oxide as in a conventional process.

Furthermore, in a conventional process in which a decomposable metal compound and a decomposable carbon compound are introduced into a hot gas containing water vapor, followed by thermal decomposition to obtain a carbon-containing composition, it is difficult to handle the decomposable metal compound, since this compound is chemically active. In addition, the conventional process has a drawback that the expensive decomposable metal compound is used. Moreover, in the conventional process, corrosive compounds such as hydrochloric acid are formed as by-products, and these corrosive compounds corrode various devices and inconveniently tend to remain in the desired carbon-containing composition.

On the contrary, in the present invention, a metal oxide powder is directly used as it is, or a metal compound powder which can be converted into the metal oxide by heating is used, and therefore the desired carbon-containing composition can be characteristically obtained safely, inexpensively and effectively on an industrial scale. In addition, the present invention has an advantage that the corrosion of devices can be prevented and any corrosive compound is not present in the desired carbon-containing composition.

Moreover, a metal carbide powder and a metal nitride power obtained by heating and reacting the carbon-containing composition are highly pure, fine and suitable for a material to be sintered, which is largely advantageous. In consequence, it is fair to say that these ceramic powders possess easily sinterable properties conveniently.

What is claimed is:

1. A method for preparing a composition containing uniformly mixed elemental carbon and an elemental oxide, which consists essentially of:
   a) introducing, into a gas having a temperature of at least about 600° C., a dispersion consisting essentially of, in a decomposable carbon-containing compound, an, elemental oxide selected from the group consisting of $SiO_2$, $TiO_2$, $WO_3$, $B_2O_3$, $MnO_2$, $Fe_2O_3$, $ZrO_2$, $HfO_2$, $MoO_3$, $Cr_2O_3$, $VO_2$, $V_2O_5$, $Nb_2O_5$ and $Ta_2O_5$;
   b) decomposing said dispersion in said gas, thereby forming a composition containing uniformly mixed elemental carbon and said elemental oxide; and
   c) recovering the formed uniformly mixed composition.

2. The method of claim 1, wherein said decomposable carbon-containing compound is selected from the group consisting of gasoline, fuel oil, kerosene, gas oil, benzene, styrene, $C_9$-fraction mixtures, tar, pitch, creosote, naphthalene, linseed oil, stearic acid and oleic acid.

3. The method of claim 1, wherein in step a), said gas is at a temperature of at least 700° C. or more.

4. The method of claim 3, wherein said gas is at a temperature of from 800° C. to 2,000° C.

5. The method of claim 1, wherein said formed carbon-containing composition is recovered with a dust collector.

6. The method of claim 5, wherein said dust collector is cooled during recovery.

7. A method for preparing an elemental carbide powder, which consists essentially of:
   a) introducing, into a gas having a temperature of at least about 600° C., a dispersion consisting essentially of, in a decomposable carbon-containing compound, an elemental oxide selected from the group consisting of $SiO_2$, $TiO_2$, $WO_3$, $B_2O_3$, $MnO_2$, $Fe_2O_3$, $ZrO_2$, $HfO_2$, $MoO_3$, $Cr_2O_3$, $VO_2$, $V_2O_5$, $Nb_2O_5$ and $Ta_2O_5$;

b) decomposing said dispersion in said gas, thereby forming a composition containing uniformly mixed elemental carbon and said elemental oxide;

c) heating the formed uniformly mixed composition in an inert atmosphere to form a metal carbide; and d) recovering the formed metal carbide powder.

8. The method of claim 7, wherein in step a), said gas is at a temperature of at least 700° C. or more.

9. The method of claim 8, wherein said gas is at a temperature of from 800° C. to 2,000° C.

10. The method of claim 7, wherein said decomposable carbon-containing compound is selected from the group consisting of gasoline, fuel oil, kerosene, gas oil, benzene, styrene, $C_9$-fraction mixtures, tar, pitch, creosote, naphthalene, linseed oil, stearic acid and oleic acid.

11. The method of claim 7, wherein said formed carbon-containing composition is recovered with a dust collector.

12. The method of claim 11, wherein said dust collector is cooled during recovery.

* * * * *